UNITED STATES PATENT OFFICE.

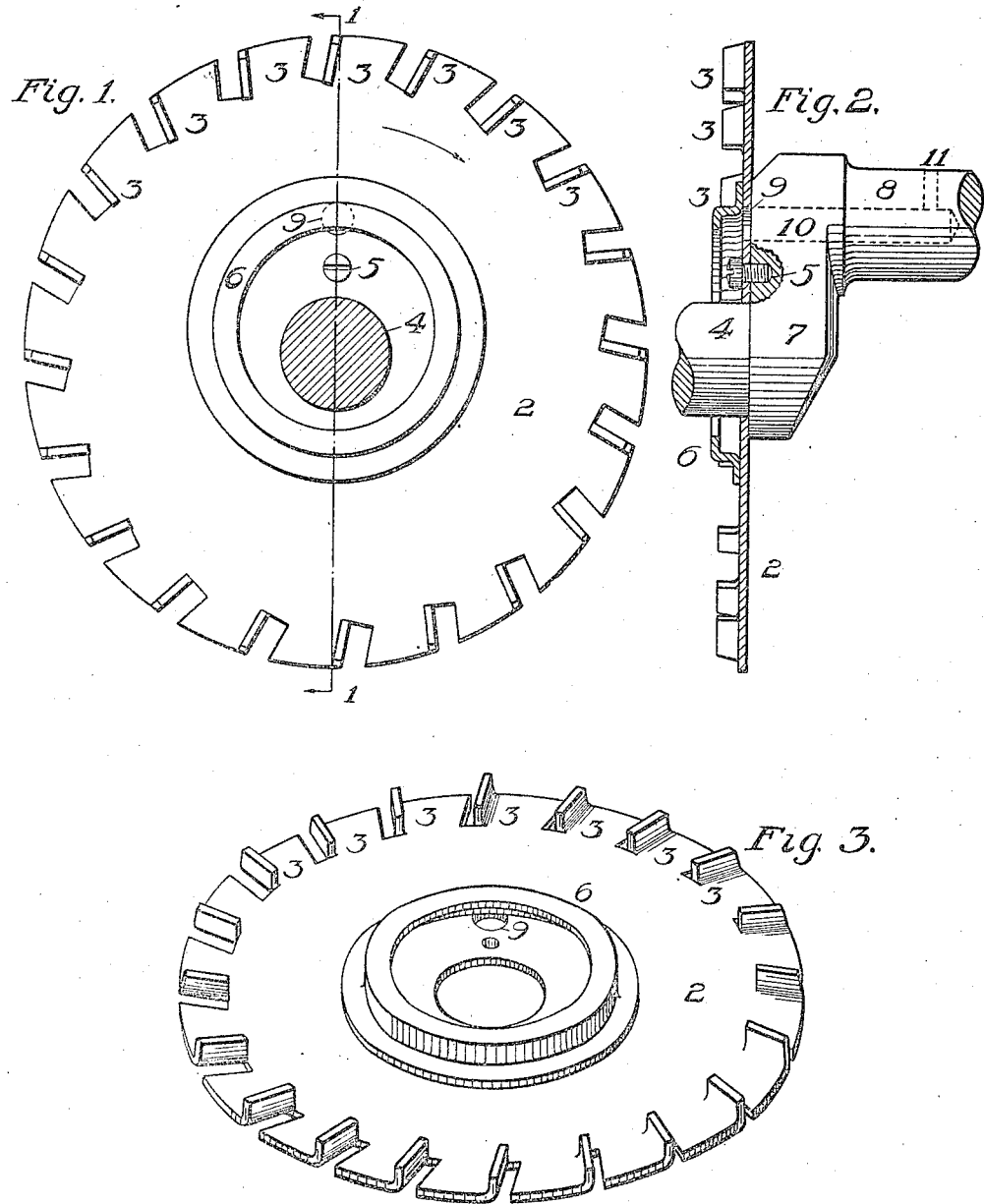

HARRY A. HUEBOTTER, OF DAVENPORT, IOWA, ASSIGNOR TO R. W. PHELPS, OF ROCK ISLAND, ILLINOIS.

LUBRICATING MEANS.

1,262,798.  Specification of Letters Patent.  Patented Apr. 16, 1918.

Application filed October 7, 1916. Serial No. 124,300.

*To all whom it may concern:*

Be it known that I, HARRY A. HUEBOTTER, citizen of the United States, residing at Davenport, in the county of Scott and State of Iowa, have invented certain new and useful Improvements in Lubricating Means, of which the following is a specification.

My present invention has to do with lubricating means, and contemplates the provision of simple and efficient means for maintaining circulation of lubricating liquid and feeding the same under pressure to the rotary element by which the lubricating means is carried, and this without the assistance of extraneous means.

To the attainment of the foregoing the invention consists in the peculiar construction and relative arrangement and combination of parts as hereinafter described and definitely pointed out in my appended claims.

In the accompanying drawing which is hereby made a part hereof:

Figure 1 is a view showing my novel lubricating means in side elevation and the crank to which the means is applied in transverse section.

Fig. 2 is a view, partly in elevation and partly in section: the sectional portion being taken in the plane indicated by the line 1—1 of Fig. 1, looking in the direction of the arrows at the ends of the line.

Fig. 3 is a perspective view of my novel lubricating means *per se* as the same appears when removed from the rotary element by which it is carried.

Similar numerals of reference designate corresponding parts in all of the views of the drawing.

In the present embodiment of my invention I provide, at 8, a rotary element in the form of a crank pin which is designed to be disposed in a bearing (not shown) and is provided with a lubricant duct 10 (see dotted lines in Fig. 2), extending from its perimeter to the face of a crank arm 7 on which is the main bearing 4 of the crank shaft about which the crank 7, the crank pin 8 and the disk 2 revolve. The said rotary element I utilize for the connection of the vane or disk 2 of my lubricating means; the vane or disk being arranged against the face of the crank arm 7 and about the crank portion 4 which it snugly surrounds, and the connection being effected, by preference, through the medium of a screw 5, Figs. 1 and 2. At 9 the disk 2 is provided with an aperture in registration with the receiving end of the duct 10, and the disk is also characterized by lubricant scoops 3 which are located adjacent to the periphery of the disk and are disposed as shown when it is intended to rotate the disk in the direction indicated by the arrow thereon in Fig. 1. I prefer in practice and for economical reasons to form the scoops 3 by cutting the disks and then bending the scoops laterally from the vertical plane of the major portion of the disk, as shown, but I do not desire to be understood as confining myself to any particular form of scoop or to any specific manner of forming and arranging the same.

In addition to the duct 10 and the disk 2 my novel lubricating means comprises an annular trough 6 that is eccentric to the disk and the crank portion 4 and is in communication with the aperture 9 in the disk so as to be connected through said aperture with the receiving end of the duct 10; the discharge end of said duct being indicated by 11. The said trough 6 is arranged at the opposite side of the disk 2, with reference to the crank arm 7, and is fixed in any approved manner with respect to the disk so as to turn therewith.

In practice the scoops 3 are arranged to dip into a body of lubricating fluid contained in a sump (not shown) and consequently when the disk 2 is rapidly rotated, the scoops will carry portions of lubricant around with them until such portions are thrown off by centrifugal force. A part of the lubricant displaced from the scoops 3 is caught by the annular trough 6, the center line of which, in the illustrated embodiment, as well as the center line of the crank portion 4, coincide with the center line of the crank arm 7 so that the point of maximum eccentricity lies at the crank pin 8. From the trough 6 the lubricant fluid is carried through the aperture 9 and duct 10 to the bearing of the crank pin or rotary element 8, and this under pressure due to centrifugal force. The advantage in thus utilizing centrifugal force to supply lubricant fluid under pressure to the bearing of the crank pin or rotary element 8 resides in the fact that the pressure so obtained follows the same law as that governing the bearing pressures caused by the inertia forces of the reciprocating and rotating elements in an internal combustion engine in which my lubricating means may be incorporated. The inertia forces alluded to which exert a heavy load on the bearings for three strokes of a four-stroke cycle vary as the square of the crank-shaft speed, and inasmuch as the lubricant-fluid pressure bears a similar relation to the crank-shaft speed, the lubrication problem in an internal combustion engine for which my lubricating means is especially intended is not complicated by excessive pressures on the bearing surfaces caused by high speeds.

Having described my invention, what I claim and desire to secure by Letters Patent is:

1. In lubricating means, the combination of a rotary element having a duct extending to its perimeter for lubrication thereof, and a vane and an open trough at one side thereof, carried by and rotatable with the rotary element; the vane being provided at the same side as the trough with means constructed and arranged to dip into and raise lubricant fluid, and to displace the lubricant fluid so raised by centrifugal force, and the trough being constructed and arranged to catch a portion of the displaced lubricant fluid and supply it to the said duct.

2. In lubricating means, the combination of a rotary element having a duct extending to its perimeter for lubrication thereof, and a vane in the form of a disk provided with scoops, and an open annular trough positioned at one side of the disk-like vane, carried by and rotatable with the rotary element; the scoops of the disk-like vane being constructed and arranged to dip into and raise lubricant fluid, and to displace the lubricant fluid so raised, by centrifugal force, and the annular trough being constructed and arranged to catch a portion of the displaced lubricant fluid and supply it to the said duct.

3. Lubricating means comprising a vane and an open trough at one side of and rotatable therewith; the vane being provided at the same side as the trough with means constructed and arranged to dip into and raise lubricant fluid and to displace the lubricant fluid, so raised, by centrifugal force, and the trough being constructed and arranged to catch a portion of the displaced lubricant fluid and being provided with an outlet so that the same may be supplied under pressure to a working part to lubricate the same.

4. Lubricating means comprising a vane in the form of a disk provided with scoops, and an open annular trough positioned at one side of the disk-like vane; the scoops of the vane being adapted to dip into and raise lubricant fluid, and to displace the lubricant fluid so raised by centrifugal force, and the annular trough being adapted to catch a portion of the displaced lubricant fluid and being provided with an outlet so that the same may be supplied to a working part to lubricate the same.

5. In lubricating means, the combination of a rotary vane to elevate lubricant fluid and displace the same by centrifugal force, and an eccentric annular trough to distribute the lubricant fluid and feed it under pressure by centrifugal force to a part to be lubricated; said trough having an outlet.

6. In lubricating means, the combination of a disk having lateral scoops on one face for elevating lubricant fluid, and an annular trough on said face of the disk having an outlet for conveying the lubricant fluid to a part to be lubricated in communication with the trough.

7. In lubricating means, the combination of a crank shaft, a vane attached to and concentric with the crank shaft and provided at one side with means constructed and arranged to raise lubricant fluid and displace same by centrifugal force, and an annular trough at the same side of the vane as said means constructed and arranged to catch a portion of the lubricant fluid and having a duct to carry it by centrifugal force to the crank pin bearing.

8. The combination in lubricating means, a crank pin having a crank arm on which is a lateral portion and also having a duct extending from its perimeter to the face of the crank arm, a disk arranged against and attached to the face of the crank arm and snugly surrounding and concentric to the lateral portion on the crank arm; said disk having adjacent to its periphery lateral scoops projecting at one side of the plane thereof, and an annular trough fixed at said side of the disk and surrounding and arranged eccentrically to said lateral portion on the crank arm and communicating with the said duct.

In testimony whereof I affix my signature in presence of two witnesses.

HARRY A. HUEBOTTER.

Witnesses:
A. G. BUSH,
HUGH WEBSTER.